March 31, 1970 R. F. ROMANOWSKI 3,503,090
FLEXIBLE TOOTH IMPROVED WINDSHIELD WASHER
Filed Jan. 29, 1968 3 Sheets-Sheet 1

INVENTOR.
Robert F. Romanowski
BY
W. A. Schuetz
ATTORNEY

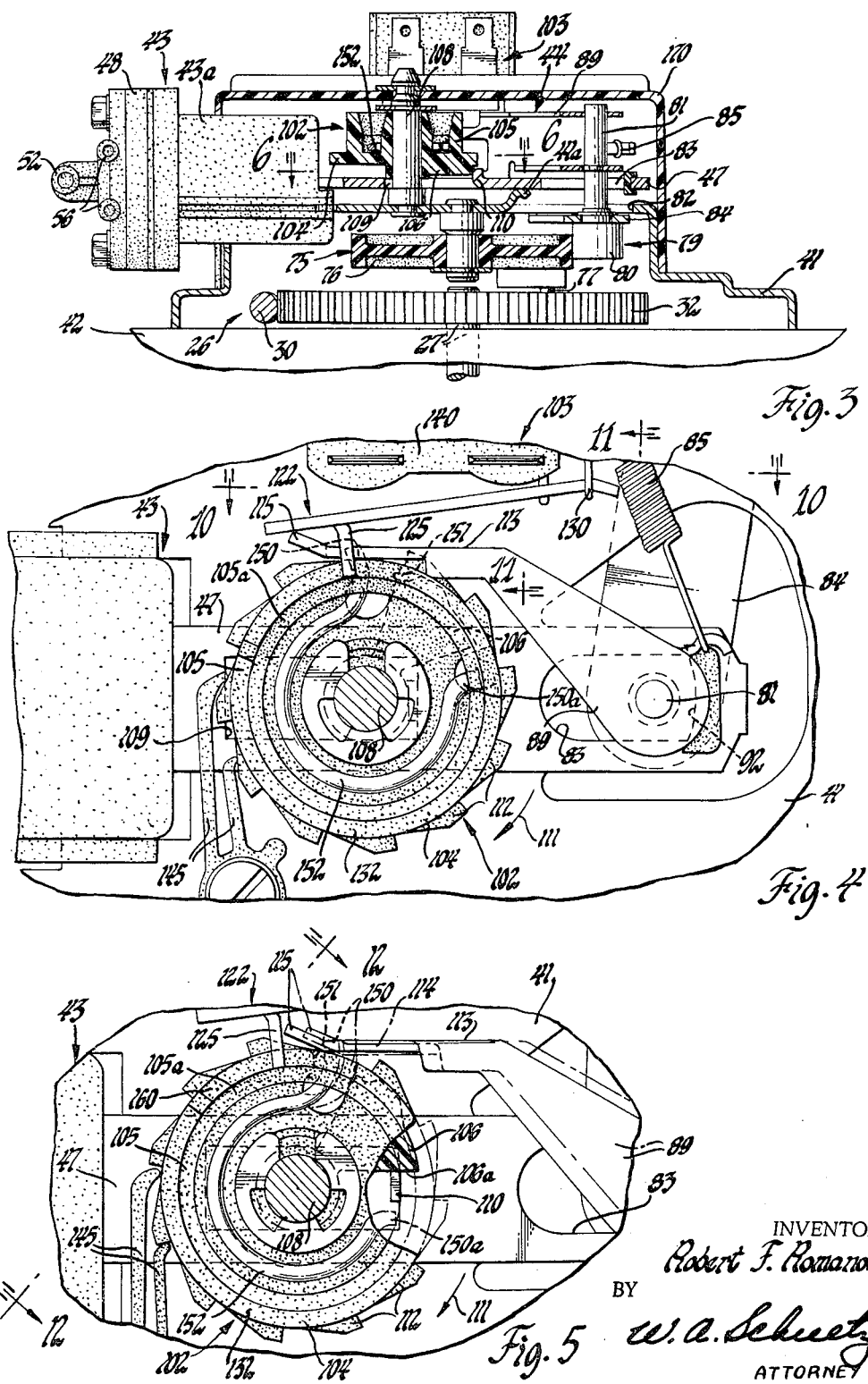

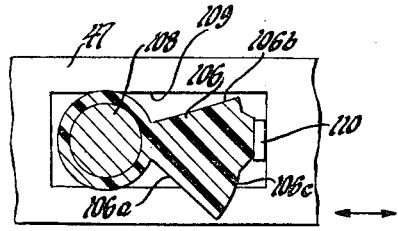
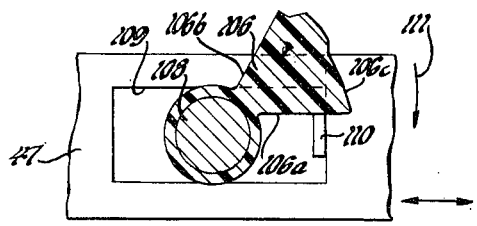
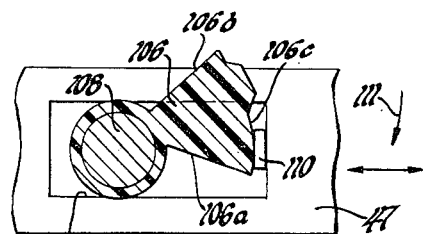
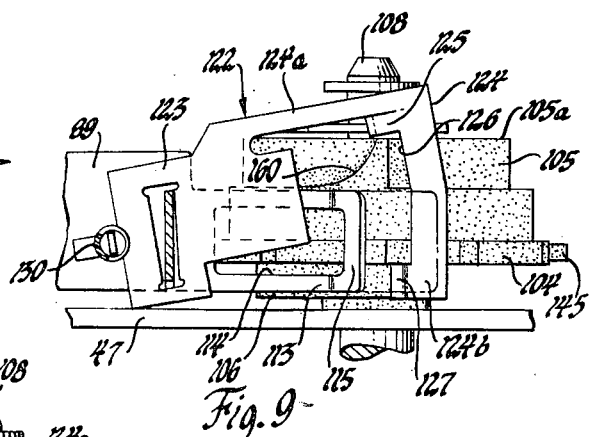
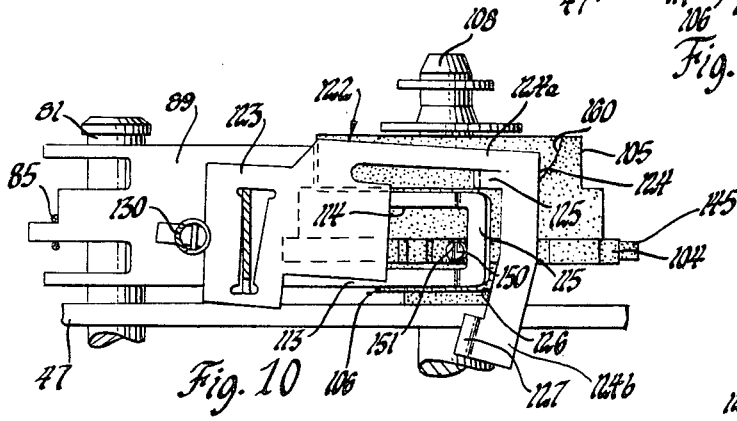
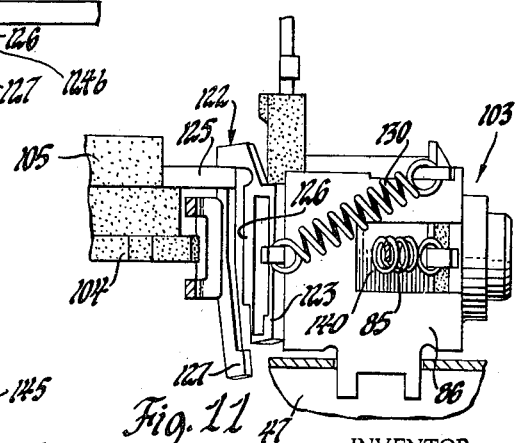

United States Patent Office 3,503,090
Patented Mar. 31, 1970

3,503,090
FLEXIBLE TOOTH IMPROVED WINDSHIELD WASHER
Robert F. Romanowski, Rochester, N.Y., assignor to General Motors Corporation, Detroit, Mich., a corporation of Delaware
Filed Jan. 29, 1968, Ser. No. 701,443
Int. Cl. B60s 1/48
U.S. Cl. 15—250.02                                    10 Claims

ABSTRACT OF THE DISCLOSURE

This disclosure relates to a windshield cleaning apparatus having a wiper unit for wiping the windshield of a vehicle and a programmed washer unit for intermittently delivering squirts of cleaning fluid to the windshield and which is operable conjointly with the wiper unit for a predetermined number of wiper strokes. The washer unit includes a reciprocable pump having a spring actuated delivery stroke and an interruptible driving connection with a wiper unit motor. The washer unit further includes a control mechanism which is operable to establish a driving connection between the pump and the wiper unit motor such that the pump is fully reciprocated through its delivery and return strokes for a predetermined number of wiper strokes so that the cleaning fluid is delivered to the windshield for each of the predetermined number of wiper strokes at the same or substantially the same pressure, and to automatically, abruptly interrupt the driving connection therebetween after the predetermined number of wiper strokes have been completed.

---

The present invention relates to a windshield cleaning apparatus, and more particularly to a windshield cleaning apparatus having a programmed washer unit which is adapted to be operated conjointly with a wiper unit to intermittently squirt cleaning fluid onto the windshield for a predetermined number of wiper strokes.

Known programmed washer units for intermittently squirting cleaning fluid onto a windshield for a predetermined number of wiper strokes have included a reciprocable, plunger type pump provided with a spring actuated delivery stroke and an interruptible driving connection with a wiper unit motor. The interruptible driving connection was effected by providing a lost motion drive connection between the pump plunger and the wiper unit motor and by providing a control mechanism which included a wiper stroke counting means in the form of an indexible ratchet wheel having a cam thereon which engaged a lug or tab on the pump plunger to hold the latter against movement through its delivery stroke when the ratchet wheel was indexed to a stop position. The driving connection for the pump was established by rotatably indexing the ratchet wheel and cam from the stop position to allow the pump plunger to be spring actuated through its delivery strokes, the ratchet wheel being successively indexed for each wiper stroke until it completed one revolution and was again in this stop position in which the cam held the plunger against movement through its delivery stroke. Such a washer unit is shown in U.S. Patent No. 3,078,493.

Although these known washer units have been quite satisfactory in operation, they have the disadvantage of wasting a certain amount of washing fluid during each programmed cycle of operation. This is due to the fact that in order to preclude interference between the cam on the ratchet wheel and the lug on the pump plunger as the ratchet wheel is being indexed, the cam was provided with a gradual rise portion which successively diminished the extent of the delivery stroke of the pump plunger as it was being indexed during the latter portion of the cycle of operation. Since the extent of the stroke of the pump was gradually diminished during the latter portion of the cycle of operation, the pressure of the cleaning fluid pumped by the pump gradually decreased such that the last or last few squirts failed to reach the desired areas of the windshield traversed by the wiper blades and thus, a wastage of washing fluid resulted.

The washer unit of the present invention is an improvement over the above described known type of washer units in that the pump plunger is permitted to fully move through the maximum extent of its strokes for each of the predetermined number of wiper strokes so that the cleaning fluid supplied by the pump is at the same or substantially the same pressure for each of the wiper strokes and then the pump is abruptly shut off so as to prevent wastage of cleaning fluid. Moreover, by abruptly shutting off the pump an improved washer unit efficiency is achieved, since the same amount of fluid is supplied by the pump to the windshield in less strokes of the pump and in less time as compared to these known washer units.

Accordingly, it is an object of the present invention to provide a new and improved washer unit which is highly efficient in operation and in which the reciprocable pump is abruptly shut off so as to prevent wastage of the cleaning fluid.

Another object of the present invention is to provide a new and improved washer unit which includes a control mechanism operable to establish a driving connection between the pump and a drive motor to fully reciprocate the pump plunger through its strokes for each of a predetermined number of wiper unit strokes and then abruptly interrupt the driving connection therebetween after the predetermined number of wiper strokes have been completed so that the washing fluid delivered to the windshield for each of the wiper strokes is at or substantially at the same pressure and so that no cleaning fluid is wasted.

Yet another object of the present invention is to provide a new and improved washer unit, as defined in the next preceding object, and in which the control mechanism includes a wiper stroke counter means in the form of an indexible ratchet wheel provided with a cam having an abrupt rise portion extending generally radially of the ratchet wheel and a circumferentially extending dwell portion for engaging a lug on the pump plunger when the ratchet wheel is in its stop position to hold the latter against movement through its delivery stroke and thus, interrupt the driving connection between the pump plunger and the drive motor, and in which the ratchet wheel has a flexible tooth which yields when the rise portion of the cam engages the lug on the reciprocable pump plunger to enable the lug to move along and clear the rise portion and which then causes the ratchet wheel to complete its indexing movement to move the dwell portion in front of the lug to prevent movement of the pump plunger.

The present invention also resides in certain novel constructions and arrangements of parts, and further objects, novel characteristics and advantages of the present invention will be apparent to those skilled in the art to which the invention relates, and from the following detailed description of a preferred embodiment of the present invention and from the accompanying drawings forming a part of the specification, and in which;

FIGURE 3 is a fragmentary sectional view taken approximately along line 3—3 of FIGURE 2;

FIGURE 4 is an enlarged fragmentary view similar to that shown in FIGURE 2, but showing certain parts thereof in different positions;

FIGURE 5 is a view similar to that shown in FIGURE 4, but showing certain parts thereof in different positions;

FIGURE 6 is an enlarged fragmentary sectional view taken approximately along line 6—6 of FIGURE 3;

FIGURES 7 and 8 are sectional views similar to that shown in FIGURE 6, but showing certain parts thereof in different positions;

FIGURE 9 is an enlarged fragmentary sectional view taken approximately along line 9—9 of FIGURE 2;

FIGURE 10 is a fragmentary sectional view taken approximately along line 10—10 of FIGURE 4;

FIGURE 11 is a sectional view taken approximately along line 11—11 of FIGURE 4; and FIGURE 12 is a fragmentary elevational view looking in the direction of the arrow 12—12 of FIGURE 5.

Figure 1:
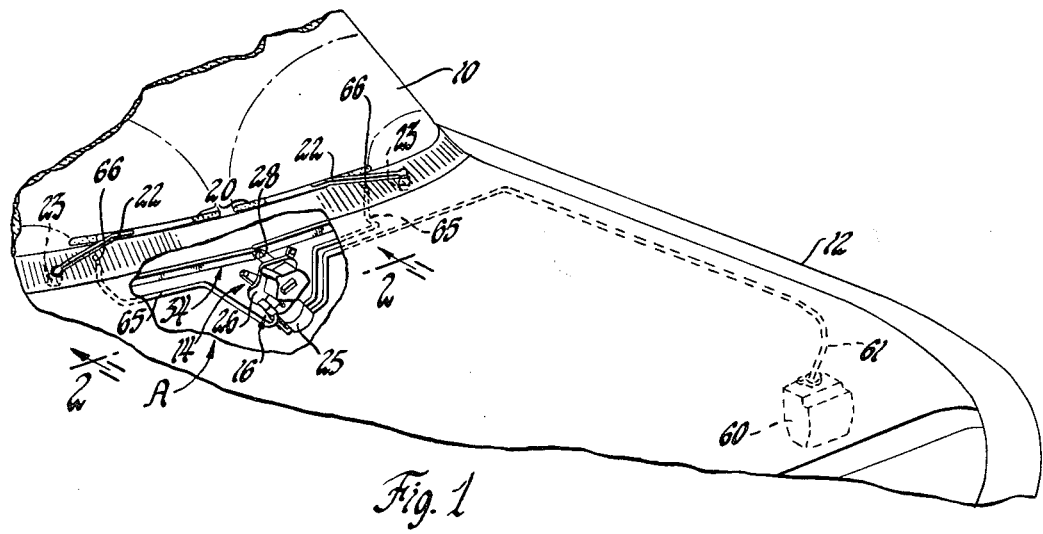
FIGURE 1 is a fragmentary perspective view of a vehicle embodying the novel windshield cleaning apparatus of the present invention.

As representing a preferred embodiment of the present invention, FIGURE 1 of the drawings shows a windshield cleaning apparatus A for cleaning a windshield 10 of an automotive vehicle 12. The windshield cleaning apparatus A broadly comprises a wiper unit 14 for wiping the windshield and a programmed washer unit 16 for delivering intermittent squirts of cleaning fluid onto the windshield and which is adapted to be operated conjointly in timed relationship with the wiper unit for a predetermined number of wiper strokes.

The wiper unit 14 comprises a pair of wiper blades 20 which are adapted to be moved to and fro in arcuate paths across portions of the windshield 10. The wiper blades 20 are carried by oscillatable wiper arms 22 drivingly connected to oscillatable drive pivots 23 carried by the vehicle at spaced locations adjacent the lower edge of the windshield 10.

The drive pivots 23 are adapted to be oscillated by a drive mechanism which includes an electric wiper motor 25 connected via a gear reduction unit 26 to a unidirectional output shaft 27 having a crank arm 28 fixed thereto. The gear reduction unit 26 comprises a worm gear 30 which is fixed to the output shaft of the motor 25 and which in turn is in meshed engagement with a worm wheel 32 fixed to the output shaft 27. The crank arm 28 is drivingly connected with the oscillatable drive pivots 23 via a suitable or conventional linkage arrangement 34 and when rotated functions through the linkage arrangement 34 to oscillate the drive pivots 23, which in turn causes the wiper arms 22 to be oscillated and the wiper blades to be moved to and fro through their arcuate paths, as shown by the dotted lines in FIGURE 1.

The washer unit 16, when actuated, is adapted to be operated conjointly with the wiper unit 14 and comprises a washer pump assembly 40 for intermittently providing squirts of cleaning fluid to be applied to the windshield 10. The washer pump assembly 40 comprises in general, a support means of frame 41 which is suitably secured to a housing 42 for supporting the gear reduction unit 26, a washer pump 43 carried by the frame 41 and which has an interruptible driving connection with the drive motor 25, and a control mechanism 44 which is operable to establish a driving connection between the pump 43 and wiper unit motor 25 for a predetermined number of wiper strokes and then automatically interrupt the driving connection therebetween.

The washer pump 43 comprises a plastic pump housing 43a secured to the support frame 41 and a reciprocably movable plunger or plunger means 45 slidably received within the housing 43a. The plunger 45 includes a piston 46 and a flat pump rod 47 having one end connected with the piston 46 and the other end projecting rearwardly, i.e., toward the right as viewed in FIGURES 2 and 3, beyond the adjacent rearward end 43b of the housing 43. As shown in FIGURE 3, the pump rod 47 adjacent its rearward end is slidably supported by a flange 41a of the frame 41. The pump 43 also includes a valve chamber part 48 secured to the housing 43a at its forward end remote from the rod 47 and which defines with the piston 46 a chamber 49. The valve chamber part 48 contains an inlet check valve 50 for controlling communication between an inlet nipple 52 and the chamber 49 and a pair of outlet check valves 53 for controlling communication between the chamber 49 and a pair of outlet nipples 56.

The plunger 45 is adapted to be reciprocably moved through intake and discharge strokes. When the plunger 45 is moved through its intake stroke, toward the right as viewed in FIGURES 2 and 3 of the drawings, washing fluid is drawn from a reservoir 60 via conduit 61, inlet nipple 52 and past the check valve 50 into the chamber 49. When the plunger 45 is moved through its discharge stroke, toward the left as viewed in FIGURES 2 and 3, the fluid in the chamber 49 is forced under pressure past the outlet check valves 53 and delivered via outlet nipples 56 and conduits 65 to a pair of nozzles 66 mounted on the vehicle 12 adjacent the wiper blades 20. The fluid delivered to the nozzles 66 is emitted in jet form and directed toward designated areas on the windshield 10 located in the path of movement traversed by the wiper blades 20.

The plunger 45 is moved through its discharge stroke by a compression spring 72 (see FIGURE 2) encircling the pump rod 47 and having one end in abutting engagement with the end wall 43b of the housing 43a and the other end in abutting engagement with the piston 46 at its side opposite the chamber 49. The compression spring 72 biases the plunger 45 toward engagement with the valve chamber part 48.

Figure 2:
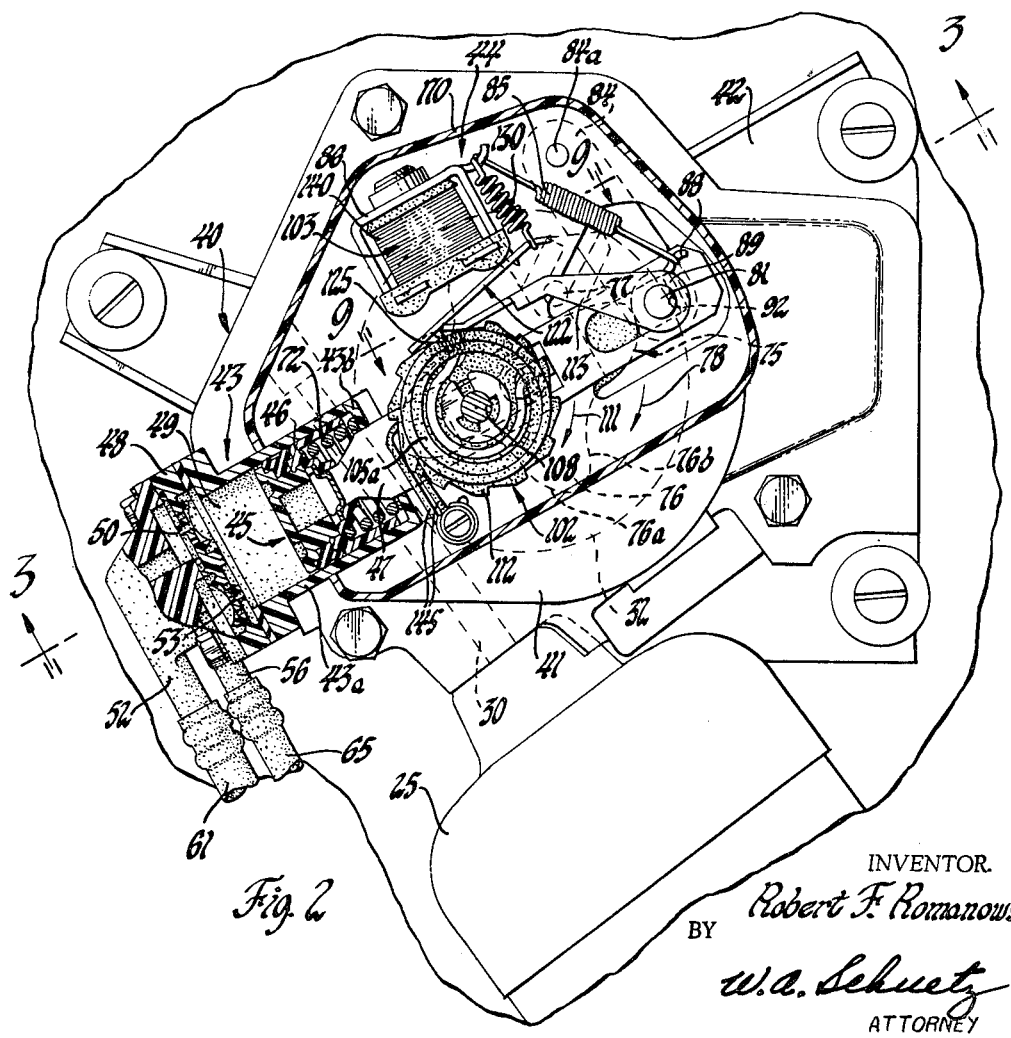
FIGURE 2 is an enlarged fragmentary sectional view of part of the windshield cleaning apparatus and taken approximately along line 2—2 of FIGURE 1.

The plunger 45 is adapted to be moved through its intake stroke in opposition to the biasing force of the compression spring 72 by a drive means 75 when the washer unit 16 is placed in operation. The drive means 75 comprises a multi-lobed cam 76 rotatably supported by the support frame 41 and located adjacent the gear reduction unit 26. As shown in FIGURE 2, each lobe of the cam has a rise portion 76a and a fall portion 76b. The cam 76 is drivingly connected to the worm wheel 32 of the gear reduction unit 14 via a drive pin 77 and is rotated in the direction indicated by the arrow 78 in FIGURE 2 when the worm wheel 32 is rotated in response to energization of the wiper unit motor 25.

The drive means 75 further includes a cam follower means 79 for moving the plunger 45 through its intake stroke. The cam follower means 79 is biased into engagement with the periphery of the cam 76 and drivingly connected with the pump rod 47 via a lost motion connection. The lost motion connection enables the driving connection therebetween to be interrupted, as will be hereinafter more fully described.

The cam follower means 79 includes a cam follower roller 80 which rolls in peripheral engagement with the cam 76 and which is rotatably journaled on the lower end of a drive member or pin 81, as viewed in FIGURE 3. The drive pin 81 projects upwardly through aligned elongated slots 82 and 83 in the frame 41 and the pump rod 47, respectively, and is connected intermediate its ends to one end of a support lever 84. The other end of the support lever 84 is pivotally connected to the support frame 41 by a pivot pin 84a.

The cam follower roller 80 is biased into peripheral engagement with the cam 76 by a tension spring 85 having one end connected with an armature frame 86 secured to the frame 41 and the other end connected with an ear 88 on a drive pawl 89 which is pivotally connected to the upper end portion of the drive pin 81. The armature frame 86 and pawl 89 comprise part of the control mechanism 44, as will hereinafter be more fully described.

The drive means 75, when the washer unit 16 is actuated, moves the plunger 45 through its intake stroke and then permits the spring 72 to move the plunger 45 through its discharge stroke. As shown in FIGURE 2, when the plunger 45 is at the end of its intake stroke the cam follower roller 80 will be engaged with the high point of the rise portion 76a of one of the lobes of the cam 76 and the drive pin 81 will be in engagement with the pump rod 47 at the rearward end 92 of the slot 83. As the cam 76 is rotated in the direction of the arrow 78, the compression spring 72 moves the plunger 45 through its discharge stroke to deliver a charge of washing fluid to the windshield 10 and the pump rod 47 and spring 85 move the cam follower roller 80 along the fall portion 76b of the lobe of the cam 76 until the roller 80 engages the low point thereof. When in this position the plunger 45 will have completed its discharge stroke. Continued rotation of the cam 76 causes the rise portion 76a of the next lobe thereof to engage the cam follower roller 80 and move the same toward the right, as viewed in FIGURES 2 and 3. As the cam follower 80 moves toward the right the drive pin 81, which remained in engagement with the pump rod 47 at the rearward end 92 of the slot 90, moves the pump rod 47 of the plunger 45 toward the right in opposition to the biasing force of the spring 72. During this movement of the plunger 45 moves through its intake stroke in which cleaning fluid is drawn from the reservoir 60 into the chamber 49 and the spring 72 is compressed or charged. The intake stroke is completed when the roller 80 is at the high point of the rise portion 76a of this lobe of the cam 76. Further rotation of the cam 76 causes the next pumping cycle to be initiated.

In accordance with the provisions of the present invention, the control mechanism 44 is operable to establish a driving connection between the plunger 45 of the pump 43 for a predetermined number of wiper strokes and during which the plunger 45 is fully reciprocated through its intake and discharge strokes for each of the predetermined number of wiper strokes, and then to automatically, abruptly interrupt the driving connection therebetween after the predetermined number of wiper strokes have been completed. The advantages afforded by the novel control mechanism 44 are that the washing fluid is delivered to the windshield by the pump 43 at or at substantially the same pressure for each of the predetermined number of wiper strokes, pump efficiency is maximized and no wastage of washing fluid results.

The control mechanism 44, in general, includes a wiper stroke counting means in the form of an indexible ratchet cam assembly 102 for controlling operation of the pump 43 and which in turn has an interruptible driving connection with the drive pawl 89 pivotally connected to the drive pin 81 of the cam follower means 79. The control mechanism 44 also includes a control means 103 which is operable, when momentarily energized by the operator, to establish a drive connection between the ratchet cam assembly 102 and the drive pawl 89 and which cooperates with the ratchet cam assembly 102 to automatically disconnect the drive connection therebetween upon the ratchet cam assembly being rotated one complete revolution.

As best shown in FIGURES 3 and 4, the ratchet cam assembly 102 includes a plastic ratchet wheel 104 having a drum 105 and a cam 106 formed integral therewith at its upper and lower sides, respectively. The ratchet cam assembly 102 is rotatably supported on a stub shaft 108 which is secured to the support frame 41 and which extends through a second elongated slot 109 in the pump rod 47, the slot 109 enabling the pump rod 47 to be reciprocated relative to the shaft 108.

The ratchet cam assembly 102 is normally disconnected from the drive pawl 89 and disposed in a stop position, as shown in FIGURES 2 and 6, in which it interrupts the driving connection between the plunger 45 of the pump 43 and the cam follower means 79. When in this position the cam 106 engages a lug or tab 110 on the pump rod 47 to hold the plunger 45 against movement through its discharge stroke by the spring 72 and the spring 72 in its charged condition. The provision of the slot 83 in the pump rod 47 provides a lost motion connection between the drive pin 81 of the cam follower means 79 and the pump rod 47 to enable the drive pin 81 to move relative to the pump rod 47 so that the drive connection therebetween can be interrupted. The cam 106 is generally wedge shaped and has abrupt rise and fall portions 106a and 106b which extend generally radially of the ratchet wheel 104 and a stepped circumferentially extending dwell portion 106c. When the ratchet cam assembly 102 is in its stop position, the outermost step of the dwell portion 106c is in engagement with the lug 110 on the pump rod 47.

The ratchet cam assembly 102 is adapted to be intermittently, rotatably indexed in the direction of the arrow 111 by the drive pawl 89 when the latter is drivingly connected therewith. To this end, the ratchet wheel 104 has a plurality of circumferentially spaced teeth 112 and the pawl 89, which is continuously moved toward and from the ratchet wheel 104 by the drive pin 81 of the cam follower means 79 when the wiper motor 25 is energized, has an end portion 113 which extends generally tangentially of the ratchet wheel 104 and which is provided with a tooth receiving window or slot 114 (see FIGURE 9). The end portion 113 of the pawl 89 is biased toward engagement with the periphery of the ratchet wheel 104 by the spring 85 and its free end 115 is adapted to hook behind the adjacently located tooth 112 on the ratchet wheel 104 when the pawl 89 is moved toward the ratchet wheel and to index the ratchet cam assembly 102 in the direction of the arrow 111 when moved away from the wheel 104.

Although the drive pawl 89 is continuously moved toward and from the ratchet wheel 104 by the drive pin 81 of the cam follower means 79, it is normally prevented from engaging and indexing the ratchet cam assembly 102 by an armature or control element 122 of the control means 103. The armature 122 is located adjacent the periphery of the ratchet wheel 104 and is suitably, pivotally supported at one end portion 123 thereby by the armature frame 86 for movement both radially and axially of the ratchet wheel 104. As best shown in FIGURES 9 and 10, the armature 122 adjacent its other or free end portion 124 is generally J-shaped and with the long leg 124a of the J-shaped portion 124 forming an extension of the portion 123 and having a finger or flange 125 (see FIGURES 2, 4 or 11) extending transversely of the plane of the armature 122 and generally radially of the ratchet cam assembly 102. The J-shaped portion 124 defines an elongated slot 126 through which the end portion 113 of the pawl 89 is adapted to pass and the short leg 124b of the J-shaped portion 124 defines a ramp surface 127 which is adapted to be engaged by the end 115 of the drive pawl 89 as the latter is moved toward and from the ratchet wheel 104 to prevent the end 115 of the pawl from hooking behind the adjacent tooth 112 on the ratchet wheel 104.

The armature 122 is biased by a tension spring 130 toward a first or normal position, as shown in FIGURE 2, in which the finger 125 engages the upper end 105a of the drum 105 and extends radially inwardly thereof and in which the ramp surface 127 is disposed in the path of movement of the drive pawl 89. The spring 130 has one end connected to the end portion 123 of the armature 122 and its other end connected with the armature frame 86. The spring 130 functions to bias the armature 122 in directions both radially inwardly of the ratchet cam assembly 102 and axially downwardly toward the ratchet wheel 104, as viewed in FIGURE 3. As best shown in FIGURE 9, the ramp surface 127 serves to engage and move the pawl 89 radially outwardly of the ratchet wheel 104 in opposition to the biasing force of the spring 85 and prevent and end 115 of the drive pawl 89 from hooking behind the adjacent tooth 112 of the ratchet wheel 104. To facilitate this movement, the end 115 of the drive pawl 89 is bent in a direction away from the periphery of the ratchet wheel 104, as clearly shown in FIGURES 2 and 4.

The armature 122 is movable from its first or normal position, as shown in FIGURES 2 and 9, to a second position, as shown in FIGURES 4 and 10 in which it is positioned such that it permits the end 115 of the pawl 89 to engage and hook behind the teeth on the ratchet wheel 104 and index the latter. When the armature 122 is in its second position, the finger 125 is in engagement with the outer periphery of the drum 105 and in engagement with an annular radially extending surface or shoulder 132 at the lower end of the drum, as viewed in FIGURE 4, and the ramp surface 127 is located out of the path of movement of the drive pawl 89. The finger 125 serves to hold the armature 122 in a position which is radially spaced from the periphery of the ratchet wheel 104 so as to enable the drive pawl 89 to drivingly engage the ratchet teeth 112.

The armature 122 is movable from its first position toward its second position in response to momentary energization of an electromagnet means 140 and via the tension spring 130. The electromagnet means 140 is carried by the armature frame 86 and functions when energized to draw the armature 122 radially away from the periphery of the ratchet wheel 104 to an intermediate position in which it is in engagement with the electromagnet means 140. When the electromagnet means 140 is de-energized, the spring 130 will pivot the armature 122 downwardly from its intermediate position toward the ratchet wheel 104 and radially inwardly against the drum until the finger 125 is in engagement with the annular surface 132.

The electromagnet means 140 is in an electric circuit with the battery (not shown) of the vehicle and a ground, and energization thereof is controlled by suitable switch (not shown) in the circuit which is to be manually operated by the operator of the vehicle. The drive motor 25 of the wiper unit 14 is in a similar electric circuit (not shown) and energization thereof is controlled by a suitable manually operable switch (not shown).

Operation of the washer unit 16 is initiated when the wiper unit 14 is energized by momentarily energizing the electromagnet means 140. Energization of the electromagnet means 140 causes the armature 122 to be moved from its first or normal position, as shown in FIGURE 2, to its intermediate position in which it is held against the electromagnet means 140. When the coil of the electromagnet means is de-energized the spring 130 moves the armature from its intermediate position to its second position, as shown in FIGURE 4, in which the finger 125 holds the armature in a position which is radially spaced from the periphery of the ratchet wheel 104 so to enable the end 115 of the pawl to engage and hook behind the teeth 112 of the ratchet wheel 104.

As the pawl 89 is moved toward the ratchet wheel 104 by the cam follower means 79, the end 115 thereof engages the adjacently located tooth 112 on the ratchet wheel 104 and is cammed radially outwardly of the ratchet wheel 104 in opposition to the biasing force of the spring 85. To facilitate this latter movement, the ratchet teeth 112 are tapered along their leading edges and the end 115 of the pawl 89 is bent in a direction away from the outer periphery of the ratchet wheel 104. The pawl 89 is cammed radially outwardly of the ratchet wheel 104 until the window 114 thereof is positioned over the adjacently located tooth 112 whereupon the spring 85 moves the end 115 of the pawl 89 radially inwardly relative to the ratchet wheel 104 to hook the end 115 behind the tooth 112. Reverse rotation of the ratchet wheel 104 is prevented by a pair of plastic, flexible backlash levers 145 carried by the frame 41.

When the pawl 89 is moved away from the ratchet wheel 104 the end 115 engages this tooth and indexes the ratchet wheel 104 in the direction of the arrow 111 an angular extent equal to the circumferential distance of one ratchet tooth. The number of ratchet teeth provided, in the preferred embodiment, is 12 and the angular extent through which the ratchet wheel 104 is indexed during each indexing movement is 30°.

As the ratchet wheel 104 is indexed in the direction of the arrow 111 during the first indexing movement, the outer step portion of the dwell portion 106c of the cam 106 is disengaged from the lug 110 on the pump rod 47. This allows the charged spring 72 to move the plunger 45 of the pump 43 through its discharge stroke. The plunger 45 when moved through its discharge stroke supplies fluid under pressure to the nozzles 66 from which the fluid is squirted against the windshield 10 and in the path of movement of the wiper blades 20. When the plunger 45 of the pump 43 moves through its discharge stroke, the drive pin 81 of the cam follower means 79 is engaged by the pump rod 47 at the rearward end 92 of the slot 83 to effect a driving connection between the pump rod 47 and the cam follower means 79. The pawl 89 is moved toward the ratchet wheel 104 by the drive pin 81 during the discharge stroke of the plunger 45 and is moved away from the ratchet wheel 104 to index the same during the intake stroke of the plunger 45.

The ratchet wheel 104 is indexed 30° in the direction of the arrow 111 by the drive pawl 89 during the intake strokes of each cycle of operation of the pump 47 and washing fluid is squirted against the windshield 10 during the discharge strokes thereof. As the ratchet wheel 104 is indexed the finger 125 rides on the annular surface 132 at the lower end of the drum 105. This operation continues through ten indexing movements.

On the 11th indexing movement of the ratchet cam assembly 102, the rise portion 106a of the cam 106 will move into the path of movement of the lug 110 on the pump rod 47. As best shown in FIGURE 7, as the plunger 45 is being moved through its intake stroke, toward the right as viewed in FIGURE 7, the lug 110 on the rod will engage the rise portion 106a of the cam 106 and interfere with the indexing movement of the ratchet wheel 104. This engagement between the lug 110 on the pump rod 47 and the rise portion 106a of the cam 106 occurs during the latter portion of the eleventh indexing movement of the ratchet wheel 104.

To preclude any jamming action between the lug 110 and the rise portion 106a of the cam 106, which could cause breakage of the parts, the ratchet wheel 104 is provided with a flexible tooth 150 which is engaged by the drive pawl 89 during the eleventh indexing movement. The flexible tooth 150 yields to allow the lug 110 on the pump rod 47 upon engaging the rise portion 106a of the cam 106 to clear the latter and then functions to rotate the ratchet cam assembly 102 through the remaining portion of the eleventh indexing movement to position the lower step of the dwell portion 106c in front of the lug 110 on the pump rod 47, as shown in FIGURE 8, to prevent the plunger from being moved through its discharge stroke upon completion of the intake stroke. This interrupts the driving connection between the pump rod 47 and the cam follower means 79, and with latter now moving relative to the pump rod 47 due to the provision of the slot 83 in the pump rod 47.

The flexible tooth 150 is in the form of a U-shaped spring 152 carried within the drum 105 and which has one end 150a securely attached to the annular wall of the drum and its other tooth like end extending through a circumferentially extending slot 151 in the side wall of the ratchet wheel 104. The spring bias is such that the tooth end is normally biased into engagement with the ratchet wheel 104 at the leftmost end of the slot 151, as viewed in FIGURE 4, and is disposed midway between two adjacent rigid teeth. The tooth end projects radially outwardly an extent equal to the radial extent of the other teeth 112. The flexible tooth 150 is of sufficient stiffness to enable the drive pawl 89 to rotate the ratchet cam assembly 102 during the 11th indexing movement until the rise portion 106a of the cam 106 interferes with the lug 110 of the pump rod 47. When this interference takes place, the drive pawl 89, which continues to move away from the ratchet wheel 104, causes the tooth 150 to yield and be moved in the direction of the arrow 111 relative to the ratchet wheel 104, as indicated by the difference between the dotted and phantom line positions in FIGURE 5. When the lug 110 on the pump rod 47 clears the rise portion 106a of the cam 106, the biasing force of the spring 152 causes the ratchet wheel 104 to be rotated through the remaining portion of this indexing movement such that the lower step of the dwell portion 106c of the cam 106 is disposed in front of the lug 110 on the pump rod 47. When this occurs, the driving connection between the pump rod 47 and the cam follower means 79 is interrupted, since the plunger cannot be moved through its discharge stroke by the spring 72.

The driving connection between the pawl 89 and the ratchet wheel 104 is automatically interrupted on the next or 12th indexing movement of the ratchet wheel 104. To this end, the drum portion 105 is provided with a sharply rising cam surface 160 (see FIGURE 12) extending from the annular surface 132 to the end wall 105a of the drum 105. As the ratchet wheel 104 is rotatably indexed through its 12th indexing movement, the finger 125 engages the cam surface 160 and is cammed upwardly, as viewed in FIGURES 3 and 12, toward the outer end wall 105a of the drum in opposition to the biasing force of the spring 130 until the finger clears the cam surface 160 whereupon the spring 130 will snap or move the armature 122 to its first or normal position, as shown in FIGURES 2 and 9. When in this position the ramp surface 127 will be disposed in the path of movement of the end 115 of the pawl 89 such that when the pawl 89 is moved toward and from the ratchet wheel 104 it engages the ramp surface 127 and is held away from the ratchet teeth on the ratchet wheel 104.

Also, during the last or 12th indexing movement of the ratchet wheel 104, the lug 110 on the pump rod 47 is cammed from the lower stepped surface onto the upper stepped surface of the dwell portion 106c of the cam 106. This further charges the spring 72 and positions the slot 83 of the pump rod 47 such that the drive pin 81, which moves within the slot during the wiper operation, will not engage the pump rod 47 at the rearward end 93 of the slot 83 so as to prevent any clicking noise. To prevent any dirt, etc., from coming into engagement with the washer pump assembly 40, a suitable removable cover 170 attached to the frame 41 is provided.

From the foregoing, it should be apparent that the driving connection between the pump rod 47 and the cam follower means 79 is abruptly interrupted at the end of the eleventh intake stroke of the plunger 45 so that the pump 43 is abruptly shut off and no wastage of fluid can take place. Moreover, it should be apparent that during the 10 indexing movements through which the pump is operative, the plunger 45 is fully reciprocated through its intake and discharge strokes so that the squirts of fluid delivered to the windshield will be at the same or substantially the same pressure during each cycle of operation of the pump.

Although the illustrated embodiment thereof has been described in great detail, it should be apparent that certain modifications, changes, and adaptations may be made in the illustrated embodiment, and that it is intended to cover all such modifications, changes and adaptations which come within the scope of the appended claims.

What is claimed is:

1. A windshield cleaning apparatus for wiping and intermittently delivering washing fluid to a windshield of a vehicle comprising: a wiper unit including a drive motor; a washer unit including a washer pump assembly comprising a pump having a plunger means which is reciprocably movable through intake and discharge strokes and which has an interruptible driving connection with said drive motor of said wiper unit; and a control mechanism operable to establish a driving connection between said plunger means and drive motor to effect a reciprocation of said plunger means of said pump through its full intake and discharge strokes for a predetermined number of wiper unit strokes and then to abruptly interrupt the driving connection therebetween immediately after said predetermined number of wiper unit strokes whereby the washing fluid delivered to the windshield for each of said predetermined number of wiper strokes is at substantially the same pressure and no wastage of washing fluid results.

2. A windshield cleaning apparatus as defined in claim 1 wherein said control mechanism includes a first means supported for movement relative to said plunger means, but which is normally disposed in a stop position in which it engages a second means on said plunger means to hold the latter against movement, a drive member drivingly connected with said drive motor and which has an interruptible driving connection with said first means, and a control means operable to establish a driving connection between said first means and said drive member for a predetermined time interval and then to automatically interrupt the driving connection therebetween, said first means when moved away from its stop position disengaging said second means and being effective to establish a drive connection between said plunger means and said drive motor and being re-engageable with and interfering with said second means when being moved toward its stop position, one of said first and second means including a yieldable means which yields to permit relative movement between said first means and said plunger means when said first and second means interferingly engage one another as said first means is being moved toward its stop position to allow said first means to be moved to its stop position and hold the plunger means against movement.

3. A windshield cleaning apparatus as defined in claim 2 wherein said first means is an indexible ratchet wheel having a cam provided with a circumferentially extending dwell portion and generally radially extending rise and fall portions and with the dwell portion engaging said second means when said ratchet wheel is in its stop position, wherein said drive member is a drive pawl which is moved toward and from the ratchet wheel, and wherein said yieldable means is a flexible, yieldable tooth on said ratchet wheel, said tooth being drivingly engaged by said drive pawl during the indexing movement of the ratchet wheel in which the rise portion of the cam engages and interferes with said second means on said plunger means as the latter is being reciprocated, said tooth yielding to allow said plunger means to move relative to said ratchet wheel and said second means to clear said rise portion and then moving said ratchet wheel through the remaining portion of its indexing movement to position the dwell portion of the cam in the path of movement of said plunger means to prevent the latter from being moved through its discharge stroke.

4. A windshield cleaning apparatus as defined in claim 3 including a spring means for moving said plunger means through its discharge stroke and wherein said cam holds said plunger means against movement through its discharge stroke and said spring in a charged condition when in its stop position.

5. A washer pump assembly for intermittently delivering washing fluid at a constant pressure for a predetermined time interval to a windshield of a vehicle comprising: a support means, a washer pump supported by said support means and having a pumping member which is movable in opposite directions through intake and discharge strokes, means for effecting movement of said pumping member through its intake and discharge strokes when operation of the washer pump assembly is initiated, said means including a drive member having an interruptible driving connection with said pumping member, and a control mechanism operable to establish a driving connection between said pumping member and said drive member to effect movement of said pumping member of said pump through its full intake and discharge strokes for a predetermined time interval and then to abruptly interrupt the driving connection therebetween immediately after said predetermined time interval whereby the washing fluid delivered for each of the discharge strokes of the pumping member is at substantially the same pressure and no wastage of washing fluid results.

6. A washer pump assembly for intermittently delivering washing fluid at a constant pressure for a predetermined time interval to a windshield of a vehicle comprising: a support means, a washer pump supported by said support means and having a pumping member which is movable in opposite directions through intake and discharge strokes, spring means for effecting movement of said pumping member through its discharge stroke, first drive means having an interruptible driving connection with said pumping member and when drivingly connected with said pumping member effecting movement of the latter through its intake stroke in opposition to the biasing force of said spring means and permitting said spring means to move said pumping member through its discharge stroke, and a control mechanism operable to establish a driving connection between said pumping member and said first drive means to effect movement of said pumping member through its full intake and discharge strokes for a predetermined time interval and then to abruptly interrupt the driving connection therebetween whereby the washing fluid will be delivered at substantially the same pressure for each of the discharge strokes and no wastage of washing fluid results, said control mechanism including an indexible means normally disposed in a stop position in which it is engageable with a means on said pumping member to hold the same against movement through its discharge stroke, second drive means having an interruptible driving connection with said first drive means for indexing said indexible means, and a control means for establishing a drive connection between said second drive means and said indexible means for a predetermined time period and then being automatically operable to interrupt the drive connection therebetween, said indexible means permitting said spring means to move said pumping member through its discharge stroke when indexed away from its stop position and interfering with said means on said pumping member when indexed toward its stop position, one of said indexible means and said means on said pumping member including a yieldable means which yields to permit relative movement between said indexible means and said means on said pumping member when said indexible means is being indexed toward its stop position to allow the latter to be moved to its stop position and to abruptly interrupt the driving connection between said pumping member and said drive means.

7. A washer pump assembly as defined in claim 6 wherein said control means includes a control element spring biased toward a first position in which it is effective to prevent said second drive means from drivingly engaging said indexible means, an electromagnet means operable to move said control element from said first position toward a second position in which it is ineffective to prevent said second drive means from drivingly engaging said indexible means when momentarily energized, and cooperable means on said control element and said indexible means for holding said control element in its second position for a predetermined number of indexing movements and then to automatically cam said control element toward its first position during the next indexing movement to interrupt the driving connection between said second drive means and said indexible means.

8. A washer pump assembly for intermittently delivering washing fluid at substantially a constant pressure for a predetermined time interval to a windshield of a vehicle comprising: a support means; a pump supported by said support means and including a plunger means which is reciprocably movable through intake and discharge strokes, a spring in operative engagement with said plunger means for moving the latter through its discharge stroke; a drive member supported by said support means for movement through work and return strokes, drive means operatively connected with said drive member for moving the latter through its work stroke, said drive member being connected with said plunger means via a lost motion connection and effecting movement of the latter through its intake stroke in opposition to the biasing force of said spring to charge said pump when drivingly engaged with said plunger means and when moved through its work stroke by said drive means; and indexible ratchet cam assembly including a ratchet wheel and cam rotatably supported by said support means, said drive member carrying a drive pawl which is cooperably engageable with said ratchet wheel to index the same a predetermined angular extent during its work strokes, said cam having a rise portion extending generally radially of said ratchet wheel and an outer circumferentially extending dwell portion which cooperably engages a lug on said plunger means when said cam is in a first position relative to the plunger means to prevent said plunger means from being moved through its discharge stroke by said spring, said dwell portion of said cam being disengageable from said lug when indexed away from said plunger means to enable said spring to move said plunger means through its discharge stroke, said lug engaging said rise portion of said cam as said ratchet wheel is being indexed toward said first position from an indexed position preceding said first position and said ratchet wheel having a flexible tooth which is engaged by the pawl during this indexing movement and which yields upon said lug engaging said rise portion to enable the lug on said plunger means to clear the rise portion of the cam, said flexible tooth being effective to move the ratchet wheel through the remaining portion of this indexing movement to position the dwell portion of the cam in front of the lug to prevent the plunger means from being moved through its discharge stroke, and a control element movable between a first position in which it is effective to prevent said drive pawl from indexing said ratchet wheel and a second position in which it is ineffective to prevent said drive pawl from engaging said ratchet wheel to index the same, and means for moving said control element from said first position toward said second position when operation of said pump is desired and for automatically moving said control element from said second position toward said first position upon said ratchet wheel being indexed one complete revolution.

9. A washer pump assembly as defined in claim 8 wherein said last named means comprises an electromagnet means operable to move said control element from said first position toward said second position when energized and wherein said control element rides on an annular surface of said ratchet cam assembly when in said second position, said annular surface including an abrupt rise portion for camming said control element from its second position toward its first position during the last indexing movement of said ratchet cam assembly.

10. A washer pump assembly as defined in claim 9 and including a spring means for biasing said control element radially inwardly of said ratchet cam assembly and axially of said ratchet cam assembly toward said annular surface.

References Cited
UNITED STATES PATENTS 2,965,913   12/1960   Ziegler _____ 15—250.02
3,078,493   2/1963    Ryck _____ 15—250.02

ROBERT W. JENKINS, Primary Examiner